United States Patent
Riess et al.

(10) Patent No.: US 8,349,944 B2
(45) Date of Patent: Jan. 8, 2013

(54) POLYMER DISPERSION IN A REACTIVE ORGANIC MEDIUM, PREPARATION METHOD AND USES

(75) Inventors: Gerard Riess, Mulhouse (FR); Christelle Delaite, Foreningen (FR); Kamal Hariri, Mulhouse (FR); Patrick Moireau, Curienne (FR)

(73) Assignee: Saint-Gobain Adfors, Chambery (FR)

( * ) Notice: Subject to any disclaimer, the term of this patent is extended or adjusted under 35 U.S.C. 154(b) by 1204 days.

(21) Appl. No.: 11/915,462

(22) PCT Filed: May 24, 2006

(86) PCT No.: PCT/FR2006/050478
§ 371 (c)(1),
(2), (4) Date: Jul. 2, 2008

(87) PCT Pub. No.: WO2007/003822
PCT Pub. Date: Jan. 11, 2007

(65) Prior Publication Data
US 2009/0214864 A1 Aug. 27, 2009

(30) Foreign Application Priority Data
May 26, 2005 (FR) ...................................... 05 51386

(51) Int. Cl.
*B05D 3/12* (2006.01)
*C04B 24/26* (2006.01)
*D02G 3/00* (2006.01)
*B32B 9/00* (2006.01)

(52) U.S. Cl. ......... 524/563; 428/375; 428/364; 428/391
(58) Field of Classification Search .................. None
See application file for complete search history.

(56) References Cited

U.S. PATENT DOCUMENTS

| | | | | |
|---|---|---|---|---|
| 4,810,763 A | 3/1989 | Mallya et al. | ................. | 526/203 |
| 4,885,350 A | 12/1989 | Yamashita et al. | ............ | 526/201 |
| 5,882,792 A | 3/1999 | Moireau | ....................... | 428/375 |
| 6,121,378 A * | 9/2000 | Miyawaki et al. | ............ | 525/100 |
| 6,251,520 B1 * | 6/2001 | Blizzard et al. | ............. | 428/375 |
| 6,403,711 B1 * | 6/2002 | Yang et al. | .................... | 525/100 |
| 2007/0081954 A1 * | 4/2007 | Mougin et al. | .................. | 424/61 |

FOREIGN PATENT DOCUMENTS

| | | |
|---|---|---|
| EP | 0 308 139 A2 | 3/1989 |
| EP | 0 933 343 A1 | 8/1999 |

* cited by examiner

*Primary Examiner* — Camie Thompson
(74) *Attorney, Agent, or Firm* — Oblon, Spivak, McClelland, Maier & Neustadt, L.L.P.

(57) ABSTRACT

The invention concerns a polymer dispersion free of water and volatile organic solvent for preparing a lubricating composition for glass yarns and for finishing glass yarns and assembling glass yarns, in particular for grids and fabrics. The dispersion comprises the product of polymerization of a vinyl monomer in the presence of a free radical initiator in a reactive organic dispersion medium.

24 Claims, No Drawings

POLYMER DISPERSION IN A REACTIVE ORGANIC MEDIUM, PREPARATION METHOD AND USES

The invention relates to a polymer dispersion in a reactive organic medium obtained by radical dispersion polymerization.

Polymers in solution or in suspension are widely used, in particular in the field of glass strands intended for the reinforcing of organic materials of the polymer type, to produce sizing or coating compositions.

Glass strands used for reinforcing are generally produced industrially from molten glass streams flowing from the multiple orifices of a bushing. These streams are drawn mechanically in the form of continuous filaments and are then gathered together into base strands which are subsequently collected, for example by winding off on a rotating support. Before they are gathered together, the filaments are coated with a sizing composition by passing over a suitable device, such as coating rolls.

The sizing composition is essential for the manufacture of the glass strands and for the production of the composite materials incorporating these strands.

During the manufacture of the strand, the sizing composition protects the glass filaments from the abrasion which occurs when the latter rub at high speed over the various members for guiding and gathering together and gives cohesion to the strand by binding the filaments together.

During the manufacture of the composite materials, the sizing composition makes possible the impregnation of the strand by the matrix to be reinforced, on the one hand, and improves the adhesion between the glass and said matrix, on the other hand, thus contributing to better mechanical properties being obtained.

The glass strands can be used as they are or can be gathered together prior to their incorporation in the matrix to be reinforced, for example in the form of woven fabrics, used in particular for the reinforcing of polymer matrices, or of grids, when nonpolymer matrices are to be reinforced. In this case, it is necessary to apply a coating to the grid which allows it to withstand the handling operations and to retain intact its structure up to the final processing stage.

The polymer solutions, emulsions and dispersions available for producing sizing or coating compositions are very largely based on water or on volatile organic solvent(s).

In point of fact, the presence of water or of organic solvent in the size or the coating has a harmful effect on the quality of the reinforcement in the composite material and consequently has to be avoided.

Water is removed by drying under conditions which vary according to whether the composition employed is a size or a coating:

- in the case of a size, drying is carried out at a temperature generally varying from 100 to 130° C. for a period of time which depends on the presentation of the strand, from a few seconds for cut strands to a few hours for wound packages of strands (rovings). The stage of drying the rovings is carried out in specific large-scale plants and, for this reason, it represents a significant part of the production cost for the strand.
- in the case of a coating, drying is carried out on the production line at a temperature which varies from 130 to 250° C., in particular with hot air or infrared radiation, for a period of time not exceeding a few minutes, preferably 1 to 5 minutes.

The drying is the important stage of the process which has a direct effect on the speed of the manufacturing line. If drying is carried out too quickly, for example at a high temperature in order to reduce the time, blistering of the composition may occur at the surface of the strands.

Some compositions require recourse to organic solvents in order to dissolve and/or disperse and/or emulsify all or part of the constituents. The solvents can be used alone or added to the aqueous solutions, emulsions and dispersions in order to improve their properties, for example in order to reduce the viscosity in order to allow better penetration between the constituent filaments of the glass strand. The use of organic solvents, generally volatile organic solvents in order to remove them more easily, makes it necessary to take additional precautions due to their higher flammability and the greater risk to the health of the personnel handling the size or the coating on the manufacturing line. In addition, it is necessary to have available plants for the continuous treatment of the effluents in order to reduce to a minimum their discharge to the atmosphere. As regulations with regard to discharging are becoming increasingly restrictive, the treatment cost, both with regard to the plants themselves and with regard to their operation, is constantly increasing.

Even if the solutions, emulsions and dispersions available on the market are relatively concentrated in polymer (40 to 80% by weight), they still comprise water and/or organic solvents, with the result that the drying stage cannot be avoided.

It is an aim of the present invention to provide a polymer dispersion devoid of water and of volatile organic solvent which is capable of being used in a sizing composition for glass strands or a coating composition for glass strands and assemblages of such strands.

Another aim of the invention is to provide a polymer dispersion comprising a high polymer content which remains stable under the normal storage conditions.

These aims are achieved by the dispersion according to the invention, which comprises the product from the polymerization of at least one vinyl monomer in the presence of a radical initiator in a reactive organic dispersing medium.

According to the invention, an organic latex is formed composed of a polymer resulting from the in situ polymerization of one or more vinyl monomers capable of polymerizing by the radical route, this polymer being dispersed in an organic medium including one or more reactive groups which can react with other compounds in a subsequent stage, said groups not, however, being capable of polymerizing by the radical route. In some cases, a small proportion of vinyl monomer(s), which can range up to 10%, is capable of reacting with the reactive organic medium, giving a grafted product which helps in the dispersing of the polymer.

The dispersion in accordance with the invention is obtained as soon as the difference between the solubility parameter of the polymer ($\delta t_p$) and the solubility parameter of the dispersing medium ($\delta t_m$) is sufficient to make possible the formation of a two-phase system. Generally, the dispersion is obtained when the following relationship is satisfied:

$$|\delta t_p - \delta t_m| \geq 4, \text{ preferably} \geq 5$$

The dispersion is prepared according to the process which comprises a stage of mixing at least one vinyl monomer, the radical initiator and the reactive organic dispersing medium and a stage of reacting the mixture at a temperature of at least 20° C. and lower than the boiling point of the compound in the mixture having the lowest boiling point. The vinyl monomer is chosen from the monomers of formula

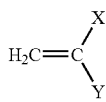

in which
- X is a $C_1$-$C_{18}$ alkyl radical, an aryl radical, preferably the phenyl radical, which can comprise one or more $C_1$-$C_4$ alkyl substituents, preferably the tolyl radical, or a $C_7$-$C_{10}$ arylalkyl radical, preferably the benzyl radical, and Y represents a hydrogen atom or a $C_1$-$C_4$ alkyl radical,
- X is the OR group in which R represents a $C_1$-$C_{18}$ alkyl radical or a $C_5$-$C_8$ cycloalkyl radical, or a radical of formula

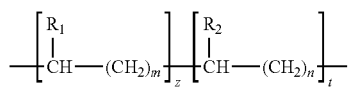

in which
- $R_1$ and $R_2$ represent a hydrogen atom, a methyl radical or an ethyl radical, $R_1$ and $R_2$ being different,
- m and n, which are identical or different, are equal to 1, 2, 3 or 4, preferably 3 or 4,
- z and t, which are identical or different, are greater than 4,
- z+t is less than or equal to 80,
- and Y represents a hydrogen atom or a $C_1$-$C_4$ alkyl radical,
- X is the $OCOR_1$ group in which $R_1$ represents a $C_1$-$C_{12}$, preferably $C_1$-$C_4$, alkyl radical, a $C_5$-$C_8$ cycloalkyl radical, preferably the cyclohexyl radical, or an aryl radical, preferably the phenyl radical, and Y represents a hydrogen atom,
- X is the $COOR_2$ group in which $R_2$ represents a $C_4$-$C_{20}$ alkyl radical, a $C_6$-$C_{20}$, preferably $C_4$-$C_{12}$, cycloalkyl radical, an aryl radical, preferably the phenyl radical, or a $C_6$-$C_{20}$ arylalkyl radical, preferably the benzyl radical, and Y represents a hydrogen atom or a methyl radical,
- X is the group of formula

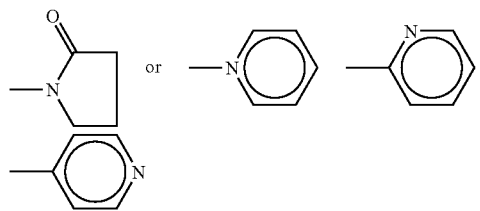

and Y represents a hydrogen atom.

Preferably, the vinyl monomer is chosen from vinyl acetate, vinyl propionate, butyl acrylate, octyl acrylate, lauryl acrylate and N-vinylpyrrolidone. Particularly preferably, the vinyl monomer is vinyl acetate, butyl acrylate, octyl acrylate or N-vinylpyrrolidone.

The radical initiator can be any known type of initiator which makes it possible to initiate the polymerization reaction by the radical route which can be activated thermally or by ultraviolet radiation. Preferably, the initiator can be activated thermally, that is to say that it can release radicals at the reaction temperature, preferably at a temperature lower by at least 10° C. than the boiling point of the compound in the mixture having the lowest boiling point. Generally, it is necessary for the initiator to be soluble preferentially in the vinyl monomer(s) to be polymerized, that is to say for the partition coefficient between the constituents of the mixture to be favorable to said monomer(s). Mention may be made, as examples of such initiators, of peroxides, hydro-peroxides, alone or in combination with a reducing agent of Fe(II), Co(II) or ascorbic acid type (redox initiators), and azo compounds. The choice is preferably made of benzoyl peroxide, lauroyl peroxide, 2,2'-azobisisobutyronitrile, 2,2'-azobismethylbutyro-nitrile and 4,4'-azobis(cyanopentanoic acid), and advantageously of lauroyl peroxide, 2,2'-azobisisobutyronitrile and 2,2'-azobismethylbutyronitrile.

The radical initiator is introduced in a proportion of 0.5 to 6% by weight of vinyl monomer, preferably 1 to 4%, advantageously 1 to 3%.

The organic dispersing medium is chosen from the compounds exhibiting at least one reactive group below:
- silicones comprising at least one epoxy group, preferably at least two epoxy groups, in terminal position(s), for example poly(alkylsiloxane)s comprising glycidyl ending(s). The silicones exhibiting a molecular weight of between 450 and 4000, preferably between 600 and 3000, are advantageous as they make possible good dissolution or dispersion of the vinyl monomer without increasing too significantly the viscosity of the composition.

Preferably, the silicone corresponds to the formula

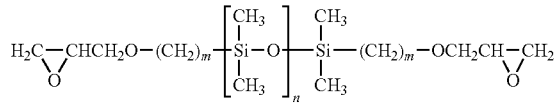

in which
- n varies from 3 to 45, preferably 10 to 30
- m varies from 1 to 20
- polyols derived from saturated or unsaturated and linear, branched or cyclic hydrocarbons.

Preferably, the polyols exhibit a molecular weight of less than 5000. Advantageously, the number of hydroxyl groups in the polyol is at most equal to 6.

Mention may be made, by way of examples, of diols, such as ethylene glycol, 1,2-propanediol, 1,4-butanediol, 1,6-hexanediol and cyclohexanedimethanol, of triols, such as glycerol and 1,2,4-butanetriol, of tetrols, such as erythritol and pentaerythritol, and of the mixtures of these compounds.

Advantageously, the dispersing medium is an α,ω-diglycidylpolydimethylsiloxane preferably having a molecular weight of the order of 2000 or ethylene glycol.

If appropriate, when the viscosity of the dispersing medium is high, a small proportion of an organic compound which acts as diluent, namely that it is not capable of reacting with the vinyl monomer and with the dispersing medium but can optionally polymerize, can be added. The diluent is chosen, for example, from ethers of fatty alcohols including at most 20 carbon atoms, preferably between 6 and 18 carbon atoms and advantageously between 8 and 16 carbon atoms, in particular the monoglycidyl ethers and the diglycidyl ethers of these fatty alcohols. The diluent is chosen according to the chemical nature of the dispersing medium; for example, an alcohol, such as 2-propanol, is chosen when the dispersing medium is a glycol, such as ethylene glycol. Generally, the proportion of diluent does not exceed 30% by weight of the dispersing medium and preferably remains below 15%.

In the mixture, the vinyl monomer and the dispersing medium are employed in a ratio by volume which does not exceed 70:30 in order to avoid phase inversion of the monomer in the dispersing medium. Preferably, the ratio is between 60:40 and 30:70.

As has already been mentioned, the polymerization reaction is carried out at a temperature of at least 20° C. and lower than the boiling point of the compound in the mixture having the lowest boiling point. The reaction conditions, in particular the temperature and the duration, vary according to the desired degree of conversion of the vinyl monomer, the final polymer and the nature and level of initiator. Generally, the polymerization is carried out at a temperature of greater than or equal to 40° C. and lower by at least 10° C. than the boiling point of the monomer having the lowest boiling point, preferably not exceeding 60° C., for a period of time which varies between 30 minutes and approximately 10 hours, preferably less than 6 hours. These polymerization conditions make it possible to obtain a degree of conversion of the vinyl monomer of greater than 80%, preferably of greater than 85%.

According to an alternative embodiment using a redox initiator as defined above, the reaction temperature does not exceed 40° C. and preferably does not exceed 30° C.

If appropriate, the content of residual vinyl monomer can be reduced by increasing the duration of the reaction or by adding an additional amount of radical initiator at the end of the reaction rather than by increasing the temperature, which can result in the evaporation of the residual vinyl monomer.

In the dispersion obtained, the polymer is found dispersed directly in the reactive organic medium, which makes it possible to avoid the intermediate stage of removal of the solvent, as is necessary with the known dispersions.

The polymer is found in the form of fine substantially spherical particles with a size of less than 40 µm, preferably of less than or equal to 15 µm and better still of less than 3 µm, which form a stable dispersion in the dispersing medium, even for a high polymer content. These particles also exhibit a narrow size distribution centered on a mean diameter of between 0.05 and 3 µm.

The combination of the size and of the distribution of the abovementioned particles contributes to the production of a stable dispersion including 20 to 70% by weight of polymer, preferably 30 to 60% and better still 40 to 60%.

The viscosity of the dispersion is generally less than or equal to 500 000 mPa·s but it can be adapted according to the application targeted, for example by adjusting in particular the amount of vinyl monomer in the starting mixture, the viscosity of the reactive organic dispersing medium, the molecular weight of the polymer and the size of the particles.

Thus, the viscosity is generally chosen to be less than 2000 mPa·s, preferably between 50 and 1000 mPa·s, for the production of a coating, and to be less than 250 mPa·s, preferably of the order of 30 to 150 mPa·s, for a size.

The dispersion can additionally comprise a stabilizing agent which helps in a better dispersion of the polymer particles in the reactive medium and makes it possible to avoid separation by settling during storage. The stabilizing agent generally exhibits a structure comprising at least one part having an affinity with the polymer particles and at least one part exhibiting an affinity with the reactive organic medium.

The stabilizing agent can be chosen from:
- alkylene oxide copolymers, for example copolymers of ethylene oxide and of propylene oxide, in particular in the form of diblock or triblock copolymers. Advantageously, the copolymers are poly(ethylene oxide)/poly (propylene oxide) diblock copolymers. These copolymers can be grafted and the pendent groups can include one or more carboxyl or sulfo functional groups,
- polymers of alkylene oxide and of at least one other polymerizable monomer, for example styrene and alkyl, in particular methyl, acrylate or methacrylate. Use is advantageously made of poly(ethylene oxide)/poly(methyl methacrylate) and poly(ethylene oxide)/polystyrene block copolymers,
- vinyl alcohol polymers preferably having a molecular weight of between 3000 and 250 000, advantageously between 10 000 and 200 000 and better still between 25 000 and 150 000. These polymers are obtained in particular by hydrolysis of the corresponding poly(vinyl acetate)s, the degree of hydrolysis generally being less than or equal to 98%. Poly(vinyl alcohol)s are more particularly employed when the reactive medium is based on polyol(s),
- silicone polymers, for example poly(alkyl-siloxane)s, such as polydimethylsiloxanes comprising acrylic or methacrylic ending(s), and polydimethylsiloxanes grafted by a poly(alkylene oxide), in particular a poly(ethylene oxide).

The stabilizing agent can be added to the mixture of the starting reactants in a proportion which can range up to 35% by weight of vinyl monomer, preferably up to 20%.

It has been found, entirely unexpectedly, that the polymerization of vinyl monomer(s) of vinyl acetate type in a dispersing medium including epoxy functional groups, in particular glycidyl functional groups, can be carried out without the addition of a stabilizing agent for the polymer. It would appear that the vinyl acetate can react with the epoxy, in particular glycidyl, functional group or groups of the dispersing medium under the conditions of the polymerization, forming a compound which acts as stabilizing agent. The fact that this compound is formed in situ in the dispersing medium during the course of the polymerization is particularly advantageous as it prevents the need to add an external stabilizing agent.

The polymer dispersion in accordance with the invention can be satisfactorily stored under normal conditions for several days, indeed even several months, generally from 3 to 6 months, at a temperature varying from 20 to 25° C., with an acceptable level of sedimentation of the particles.

The dispersion in accordance with the invention exhibits the following advantages:
- it does not comprise water and, consequently, the energy-consuming drying stage is avoided,
- it does not comprise volatile solvent and the risk of contaminating emissions harmful to the environment and to the health of the operators are greatly reduced,
- the content of residual vinyl monomer is very low, less than 10% of the weight of the dispersion, preferably less than 5%,
- the content of polymer in the dispersion is high, which makes it possible to have low-volume storage facilities.

The dispersion according to the invention can be used as has already been indicated for preparing sizing or coating compositions.

The expression "sizing composition" has the meaning usually accepted in the field of glass strands: it denotes a composition capable of being deposited on glass filaments during drawing, before they are gathered together into one or more base strands. The sizing composition serves to protect the glass filaments from abrasion during the manufacture of the strand and to improve the impregnation of the strand by the matrix to be reinforced and the coupling between the glass and said matrix.

The expression "coating composition" denotes a composition which can be applied to the glass strand at various stages of the process after fiberizing, for example strands originating from wound packages (rovings), or to an assemblage of such strands, which may or may not be intertwined, for example a woven fabric, a knitted fabric, a grid or a material. The role of the coating is to bind the strands together and to improve their strength when they are finally used.

Conventionally, these compositions are prepared by adding specific additives, in particular at least one compound which can react with the epoxy or hydroxyl reactive functional groups of the dispersing medium, such as amino compounds and isocyanates, to the dispersion. It is also possible to add cycloepoxide compounds which can react under the effect of ultraviolet radiation by catalysis of the Lewis acid type starting from compounds such as triarylsulfonium hexafluoroantimonate, triarylsulfonium hexafluorophosphate of antimony, triarylsulfonium tetrafluoroborate of antimony, diaryliodonium hexafluoroantimonate and derivatives of ferrocene type.

The sizing composition is applied to filaments formed of glass of any nature, for example E, C, AR (alkali-resistant) or with a low level of boron (less than 5%). Preference is given to glass E and glass with a low level of boron.

These filaments have a diameter which can vary to a large extent, for example 5 to 24 µm, preferably 9 to 17 µm. The final glass strand generally has a count of between 10 and 4800 tex, preferably 68 to 2400 tex.

The coating composition is for its part applied to a glass strand or to an assemblage of such strands, in particular in the grid or woven fabric form, for example by spraying or immersion in a bath.

The glass strands coated with the size and the strands or assemblages of such glass strands treated with the coating are subjected to a treatment, for example a heat treatment or a treatment under ultraviolet radiation, in order to obtain the crosslinking of the size or of the coating.

The examples which follow make it possible to illustrate the invention without, however, limiting it.

EXAMPLES

The vinyl monomer, the reactive organic dispersing medium, the radical initiator and, if appropriate, the stabilizing agent are introduced into a reactor equipped with a mechanical stirrer, a water-circulation reflux condenser, a system which ensures circulation of nitrogen and an oil bath.

The reaction mixture is heated at a temperature lower by 10° C. than the boiling point of the vinyl monomer for 7 hours with stirring (150 rpm).

The following compounds are used in the contents shown in table 1:

Vinyl Monomer
  VAC: vinyl acetate
  VP: N-vinylpyrrolidone
  BA: butyl acrylate
  OA: octyl acrylate
Dispersing Medium
  PDMS-DG: α,ω-diglycidylpolydimethylsiloxane (weight-average molecular weight (MW): 2500); sold by Goldschmidt under the reference Tegomer E-SI 2330
  EG: ethylene glycol
Radical Initiator:
  ACPA: 4,4'-azobis(cyanopentanoic acid)
  AIBN: 2,2'-azobisisobutyronitrile
  AMBN: 2,2'-azobismethylbutyronitrile; sold by DuPont under the reference Vazo® 67
  BP: benzoyl peroxide
  LP: lauroyl peroxide
Stabilizing Agent:
  PDMS-MA: polydimethylsiloxane comprising methacrylic endings; sold by Shin-Etsu under the reference X22-174 DX (weight-average molecular weight (MW): 4600)
  PDMSgPEO: polydimethylsiloxane grafted with poly(ethylene oxide); sold by Goldschmidt under the reference Tegopren 5842
  PMMA-PEO: poly(methyl methacrylate)/poly(ethylene oxide) block copolymer; sold by Goldschmidt under the reference ME
  PS-PEO: polystyrene/poly(ethylene oxide) block copolymer; sold by Goldschmidt under the reference SE
  PVAL: poly(vinyl alcohol) derived from poly(vinyl acetate) (degree of hydrolysis: 88%; molecular weight: 88 000); sold by Gohsenol under the reference GL 05
Diluant:
  LA-MG: lauryl alcohol monoglycidyl ether; sold by Huntsman Chemicals under the reference Araldite® DY0391.

The following measurements are carried out starting from the dispersion obtained:

the mean size of the polymer particles, expressed in nanometers, is measured by photon correlation spectroscopy under an incident beam of laser light and measurement of the light scattered under an angle of 90° using a Coulter N4 Plus device (for sizes up to 3000 nm) and an LS 230 device (for sizes up to $2 \times 10^6$ nm)

the viscosity, in mPa·s, is measured at 25° C. using a rotary viscometer (Rheomat RM 180).

the stability is measured by giving the sedimentation time under static conditions corresponding to separation by settling of 25% by volume of the dispersion ($t_{25}$, expressed in days).

the degree of conversion of the vinyl monomer(s) is measured by $^1$H NMR.

In table 1, it is found that the poly(vinyl acetate) dispersions are stable without the addition of a stabilizing agent for at least 30 days (Ex. 6 to 8) and more than 60 days at a lower content of polymer (Ex. 1 to 5). For the more concentrated dispersions, the addition of a stabilizing agent is necessary to obtain a stability of at least 8 days (Ex. 30 to 34). The degree of conversion of the vinyl monomer is at least equal to 90%.

The addition of stabilizing agent to the vinyl-pyrrolidone and acrylic polymer dispersions makes it possible to obtain particles which are small in size (less than 1 µm) and makes it possible to increase the duration of the storage (Ex. 9 and 10; Ex. 23 and 24).

The solubility parameter of the polymer ($\delta t_p$) and the solubility parameter of the dispersing medium ($\delta t_m$) are calculated according to the method described by D. W. Van Krevelen in the work "Properties of polymers"; Elsevier Science Publisher, 1990, pp. 212-213. The difference $|\delta t_p - \delta t_m|$ for the examples of table 1 is given below:

|  | $|\delta t_p - \delta t_m|$ |
|---|---|
| Example 1-8 and 30-32 | 6.8 |
| Examples 9-11 and 25 | 7.0 |
| Examples 12 to 24 | 5.7 |

TABLE 1

| Ex. | Vinyl monomer/dispersing medium (volume/volume) | Radical initiator (% by weight/vinyl monomer) | Stabilizing agent (% by weight/vinyl monomer) | Mean size (nm) | Viscosity (mPa·s) | $t_{25}$ stability (days) |
|---|---|---|---|---|---|---|
| 1 | VAC/PDMS-DG 20/80 | LP 2% | — | 684 | 86 | >60 |
| 2 | VAC/PDMS-DG 20/80 | LP 4% | — | 524 | 92 | >60 |
| 3 | VAC/PDMS-DG 20/80 | AIBN 2% | — | n.d. | 88 | >60 |
| 4 | VAC/PDMS-DG 20/80 | AIBN 4% | — | 553 | 93 | >60 |
| 5 | VAC/PDMS-DG 20/80 | BP 4% | — | 345 | n.d. | >60 |
| 6 | VAC/PDMS-DG 30/70 | LP 2% | — | 614 | 143 | >30 |
| 7 | VAC/PDMS-DG 30/70 | AIBN 2% | — | 807 | 140 | >30 |
| 8 | VAC/PDMS-DG 30/70 | BP 2% | — | 633 | 145 | >30 |
| 9 | VP/PDMS-DG 20/80 | LP 2% | — | 5600 | 85 | 15 |
| 10 | VP/PDMS-DG 20/80 | LP 2% | PDMS-MA 15% | 170 | 85 | >60 |
| 11 | VP/PDMS-DG 30/70 | LP 2% | PDMS-MA 10% | 235 | 100 | >30 |
| 12 | BA/PDMS-DG 20/80 | LP 2% | — | n.d. | n.d. | 1 |
| 13 | BA/PDMS-DG 20/80 | BP 2% | — | n.d. | n.d. | 1 |
| 14 | BA/PDMS-DG 20/80 | AIBN 2% | — | n.d. | n.d. | 1 |
| 15 | BA/PDMS-DG 20/80 | AIBN 4% | PDMSgPEO 10% | n.d. | n.d. | 4 |
| 16 | BA/PDMS-DG 20/80 | LP 2% | PMMA-PEO 5% | n.d. | n.d. | 3 |
| 17 | BA/PDMS-DG 20/80 | LP 2% | PMMA-PEO 10% | n.d. | n.d. | 5 |
| 18 | BA/PDMS-DG 20/80 | AIBN 2% | PMMA-PEO 20% | n.d. | n.d. | 9 |
| 19 | BA/PDMS-DG 20/80 | AIBN 3% | PDMSgPEO 10% | n.d. | n.d. | 3 |
| 20 | BA/PDMS-DG 20/80 | AIBN 3% | PS-PEO 20% | n.d. | n.d. | 2 |
| 21 | BA/PDMS-DG 20/80 | AIBN 3% | PDMSgPEO 20% | n.d. | n.d. | 2 |
| 22 | BA/PDMS-DG 20/80 | AIBN 1% | PDMS-MA 10% | 500 | 130 | >60 |

| Ex. | Vinyl monomer/dispersing medium (volume/volume) | Radical initiator (% by weight/vinyl monomer) | Stabilizing agent (% by weight/vinyl monomer) | Diluent (% by weight/vinyl monomer) | Vinyl monomer conversion (%) | Mean size (nm) | Viscosity (mPa·s) | $t_{25}$ stability (days) |
|---|---|---|---|---|---|---|---|---|
| 23 | BA/PDMS-DG 20/80 | AIBN 3% | PDMS-MA 15% | — | n.d. | 700 | 95 | >90 |
| 24 | BA/PDMS-DG 20/80 | AIBN 3% | — | — | n.d. | 1600 | 95 | 1 |
| 25 | BA/PDMS-DG 30/70 | AIBN 3% | PDMS-MA 15% | — | n.d. | 100 | n.d. | >60 |
| 26 | OA/PDMS-DG 20/80 | LP 1% | — | — | n.d. | n.d. | n.d. | 1 |
| 27 | OA/PDMS-DG 20/80 | LP 2% | — | — | n.d. | n.d. | n.d. | 1 |
| 28 | OA/PDMS-DG 20/80 | BP 2% | — | — | n.d. | n.d. | n.d. | 1 |
| 29 | OA/PDMS-DG 20/80 | LP 2% | PDMS-MA 15% | — | n.d. | 300 | 135 | >14 |
| 30 | VAC/PDMS-DG 70/30 | AMBN 2% | PDMS-MA 5% | LA-MG 10% | 98.3 | 1000 (52%) + 15820 (48%) | 20250 | >30 |
| 31 | VAC/PDMS-DG 50/50 | AMBN 2% | PDMS-MA 5% | — | 98.5 | 900 (70%) + 19700 (30%) | 3770 | 8 |
| 32 | VAC/PDMS-DG 50/50 | AIBN 3% | PDMS-MA 10% | — | 92.0 | 530 | 1825 | >60 |
| 33 | VAC/EG/PDMS-DG 38/57/5 | LP 3% | PVAL 8%; H₂O 10% | — | n.d. | n.d. | 34000 | >30 |
| 34 | VAC/EG/PDMS-DG 36.5/54.5/9 | LP 3% | PVAL 10% | — | n.d. | n.d. | 20000 | 15 |
| 35 | VP/PDMS-DG 40/60 | ACPA 3% | PDMS-MA 10% | — | 90.0 | 15000 | 174 | 10 |

What is claimed is:

1. A polymer dispersion comprising a polymer in an organic medium, which comprises the product from the polymerization of at least one vinyl monomer in the presence of a radical initiator in a reactive organic dispersing medium, wherein the vinyl monomer is selected from the group consisting of the monomers of formula

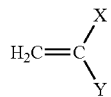

in which (1) X is a $C_1$-$C_{18}$ alkyl radical, an aryl radical which can comprise one or more $C_1$-$C_4$ alkyl substituents, or a $C_7$-$C_{10}$ arylalkyl radical, and Y represents a hydrogen atom or a $C_1$-$C_4$ alkyl radical, or (2) X is an OR group in which R represents a $C_1$-$C_{18}$ alkyl radical or a $C_5$-$C_8$ cycloalkyl radical, or a radical of formula

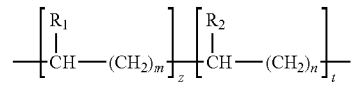

in which $R_1$ and $R_2$ represent a hydrogen atom, a methyl radical or an ethyl radical, $R_1$ and $R_2$ being different, m and n, which are identical or different, are equal to 1, 2, 3 or 4, z and t, which are identical or different, are greater than 4, z +t is less than or equal to 80, and Y represents a hydrogen atom or a $C_1$-$C_4$ alkyl radical, or (3) X is an $OCOR_1$ group in which $R_1$ represents a $C_1$-$C_{12}$ alkyl radical, a $C_5$-$C_8$ cycloalkyl radical, or an aryl radical, and Y represents a hydrogen atom, or (4) X is a $COOR_2$ group in which $R_2$ represents a $C_4$-$C_{20}$ alkyl radical, a $C_6$-$C_{20}$ cycloalkyl radical, an aryl radical, or a $C_6$-$C_{20}$ arylalkyl radical, and Y represents a hydrogen atom or a methyl radical, or (5) X is a group of formula

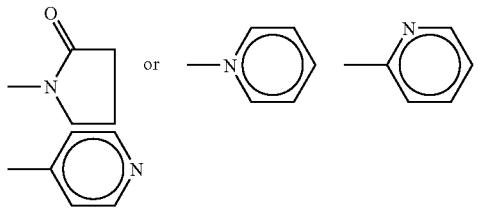

and Y represents a hydrogen atom;
and wherein the reactive organic dispersing medium comprises a silicone comprising at least one epoxy group in terminal position(s).

2. The dispersion as claimed in claim 1, which exhibits a difference between the solubility parameter of the polymer ($\delta t_p$) and the solubility parameter of the dispersing medium ($\delta t_m$) which satisfies the relationship:

$|\delta t_p - \delta t_m| \geq 4$.

3. The dispersion as claimed in claim 1, wherein the vinyl monomer is selected from the group consisting of vinyl acetate, vinyl propionate, butyl acrylate, octyl acrylate, lauryl acrylate and N-vinylpyrrolidone.

4. The dispersion as claimed in claim 1, wherein the dispersing medium is a silicone of formula

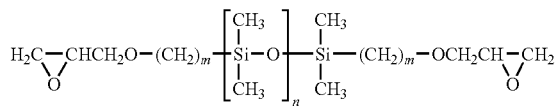

in which
n varies from 3 to 45
m varies from 1 to 20.

5. The dispersion as claimed in claim 1, wherein the silicone has a molecular weight of between 450 and 4000.

6. The dispersion as claimed in claim 1, wherein the polymer is in the form of fine substantially spherical particles with a size of less than 40 μm.

7. The dispersion as claimed in claim 6, wherein the particles exhibit a narrow size distribution centered on a mean diameter of between 0.05 and 3 μm.

8. The dispersion as claimed in claim 1, which comprises 20 to 70% by weight of polymer.

9. The dispersion as claimed in claim 1, which exhibits a viscosity of less than 500 000 mPa·s.

10. The dispersion as claimed in claim 1, which additionally comprises a stabilizing agent selected from the group consisting of
alkylene oxide copolymers,
polymers of alkylene oxide and of at least one other polymerizable monomer,
vinyl alcohol polymers, and
silicone polymers.

11. A process for the preparation of the dispersion as claimed in claim 1, comprising the following stages
a) mixing the at least one vinyl monomer, the one radical initiator and the one reactive organic dispersing medium, and
b) reacting the mixture at a temperature of at least 20° C. and lower than the boiling point of the compound in the mixture having the lowest boiling point.

12. The process for the preparation of the dispersion as claimed in claim 11, wherein the initiator can be activated thermally at the reaction temperature.

13. The process for the preparation of the dispersion as claimed in claim 12, wherein the radical initiator is selected from the group consisting of peroxides, hydroperoxides and azo compounds.

14. The process for the preparation of the dispersion as claimed in claim 11, wherein the amount of radical initiator represents 0.5 to 6% by weight of vinyl monomer.

15. The process for the preparation of the dispersion as claimed in claim 11, wherein the vinyl monomer and the dispersing medium are employed in a ratio by volume not exceeding 70:30.

16. The process for the preparation of the dispersion as claimed in claim 11, wherein the reaction temperature is greater than or equal to 40° C.

17. The process for the preparation of the dispersion as claimed in claim 11, wherein a redox initiator is used and in that the reaction temperature does not exceed 40° C.

18. The process for the preparation of the dispersion as claimed in claim 11, wherein a stabilizing agent is added to the mixture of stage a) in a proportion which can range up to 35% by weight of vinyl monomer.

19. A sizing composition capable of coating glass filaments, which comprises a dispersion as claimed in claim 1.

20. A glass strand comprising glass filaments which are coated with the sizing composition as claimed in claim 19.

21. A coating composition capable of coating glass strands or an assemblage of glass strands, which comprises a dispersion as claimed in claim 1.

22. A glass strand or an assemblage of glass strands coated with a coating composition as claimed in claim 21.

23. A glass strand comprising glass filaments which are coated with a sizing composition comprising a polymer dispersion comprising a polymer in an organic medium, which comprises the product from the polymerization of at least one vinyl monomer in the presence of a radical initiator in a reactive organic dispersing medium, wherein the vinyl monomer is selected from the group consisting of the monomers of formula

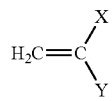

in which
(1) X is a $C_1$-$C_{18}$ alkyl radical, an aryl radical which can comprise one or more $C_1$-$C_4$ alkyl substituents, or a $C_7$-$C_{10}$ arylalkyl radical, and Y represents a hydrogen atom or a $C_1$-$C_4$ alkyl radical, or
(2) X is an OR group in which R represents a $C_1$-$C_{18}$ alkyl radical or a $C_5$-$C_8$ cycloalkyl radical,
or a radical of formula

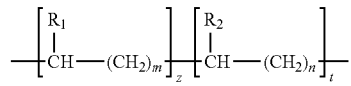

in which
$R_1$ and $R_2$ represent a hydrogen atom, a methyl radical or an ethyl radical, $R_1$ and $R_2$ being different, m and n, which are identical or different, are equal to 1, 2, 3 or 4,
z and t, which are identical or different, are greater than 4,
z +t is less than or equal to 80,
and Y represents a hydrogen atom or a $C_1$-$C_4$ alkyl radical, or (3) X is an $OCOR_1$ group in which $R_1$ represents a $C_1$-$C_{12}$ alkyl radical, a $C_5$-$C_8$ cycloalkyl radical, or an aryl radical, and Y represents a hydrogen atom, or (4) X is a $COOR_2$ group in which $R_2$ represents a $C_4$-$C_{20}$ alkyl radical, a $C_6$-$C_{20}$ cycloalkyl radical, an aryl radical, or a $C_6$-$C_{20}$ arylalkyl radical, and Y represents a hydrogen atom or a methyl radical, or (5) X is a group of formula

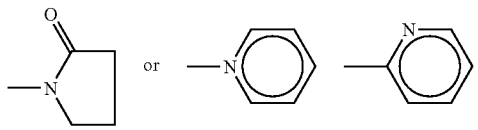

-continued

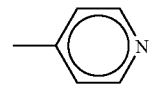

and Y represents a hydrogen atom;

and wherein the reactive organic dispersing medium comprises a silicone comprising at least one epoxy group in terminal position(s).

24. The glass strand according to claim 23, wherein the reactive organic dispersing medium is at least one selected from the group consisting of (1) silicones comprising at least one epoxy group in terminal position(s) and (2) polyols derived from saturated or unsaturated and linear, branched or cyclic hydrocarbons.

* * * * *